United States Patent Office 3,515,545
Patented June 2, 1970

---

3,515,545
REFRACTORY AND CERAMIC BRAZING ALLOYS
Domenic A. Canonico, Oak Ridge, Lloyd G. Bryson, Powell, and Gerald M. Slaughter, Oak Ridge, Tenn., assignors to the United States of America as represented by the United States Atomic Energy Commission
No Drawing. Filed Sept. 29, 1967, Ser. No. 671,883
Int. Cl. C22c 15/00
U.S. Cl. 75—134     1 Claim

---

ABSTRACT OF THE DISCLOSURE

The present invention relates to a class of brazing alloys having particular utility for brazing parts of (a) a refractory metal selected from the group consisting of tantalum, molybdenum, titanium, and niobium, and alloys thereof, and (b) ceramics such as alumina, beryllia, and titania to themselves and to each other which comprises an alloy containing equal parts, by weight, of titanium and zirconium and a ternary metal additive selected from the group consisting of tantalum, silicon, germanium, chromium, boron, and niobium, the ternary addition being in such amounts as to form a ternary alloy whose melting point is at or below the melting point of the binary titanium-zirconium alloy.

---

The invention described herein was made in the course of, or under, a contract with the United States Atomic Energy Commission.

The present invention relates to, and has for its principal object to provide, a selected class of brazing alloys having particular utility in joining a refractory metal selected from the group consisting of tantalum, molybdenum, tungsten, and niobium, and alloys of these selected metals as well as ceramics such as alumina, beryllia, and titania to themselves and to each other. Another object of this invention is to provide a class of brazing alloys which melt at a temperature in the range 1025° C. to 1600° C., wets and flows freely on the surface of the selected metals or ceramics, and forms high strength temperature joints at elevated temperatures as composite structures with and between the aforementioned class of selected metals, alloys, and ceramics. Another object is to provide composite structures made from the aforementioned materials.

As a new article of manufacture, the invention can be defined in terms of a composite structure comprising at least two component parts of which are the selected metal, alloy, and ceramic and a connecting piece metallurgically and/or mechanically bonded to and between said component parts, said connecting piece prior to forming part of said composite being at least one alloy selected from the group consisting of in weight percent, a sufficient quantity of a metal selected from the group tantalum, silicon, germanium, chromium, boron, and niobium which, when added to a binary alloy consisting essentially of equal parts, by weight, of titanium and zirconium, results in a ternary alloy whose melting point is lower than the reference titanium-zirconium alloy. This invention is based on the discovery that elements from the selected class when added to a binary titanium-zirconium alloy produced a ternary alloy having particular utility for brazing a metal, alloy, or ceramic of the selected class to produce a high strength joint between the several selected parts.

From a metallurgical point of view it would normally be expected that a binary alloy containing equal amounts of such reactive metals as titanium and zirconium should serve as an excellent brazing composition based on the well known reactivity of these elements to wet and flow on refractory metal and ceramic surfaces. While our experimental evidence has confirmed the good wetting and flow properties of this binary alloy, it makes poor unevenly filleted and relatively weak joints. A high temperature braze joint made from the selected braze alloy of this invention would be of particular utility in forming brazed joints designated for high temperature conditions in the range 800° C.–1250° C.

We have found that when the selected ternary metal additive is mixed with equal amounts of titanium and zirconium, it has the effect of lowering the melting temperature of the resultant ternary alloy in comparison to the referenced titanium-zirconium binary alloy, and in addition creates a brazing alloy which not only wets and flows smoothly on the surface of the selected base material but forms evenly filleted joints which display high tensile strength even at temperatures in the range 100° C.–200° C. of their melting points. Representative brazing alloy compositions within the scope of this invention and their approximate melting points, i.e., ±25° C. are listed below in weight percent.

TABLE I

| Ti | Zr | Ta | M.P.(±25° C.) |
|---|---|---|---|
| 50 | 50 | 0 | 1,600 |
| 42.5 | 42.5 | 15 | 1,550 |
| 40 | 40 | 20 | 1,570 |
| 35 | 35 | 30 | 1,600 |

| | | Si | M.P. |
|---|---|---|---|
| 49.5 | 49.5 | 1 | 1,400 |
| 49 | 49 | 2 | 1,280 |
| 48 | 48 | 4 | 1,200 |
| 47 | 47 | 6 | 1,300 |
| 46 | 46 | 8 | >1,500 |

| | | Ge | |
|---|---|---|---|
| 49.5 | 49.5 | 1 | 1,525 |
| 49 | 49 | 2 | 1,460 |
| 47.5 | 47.5 | 5 | 1,320 |
| 45 | 45 | 10 | 1,200 |
| 44 | 44 | 12 | 1,260 |
| 42.5 | 42.5 | 15 | 1,350 |
| 40 | 40 | 20 | 1,500 |

| | | Cr | |
|---|---|---|---|
| 47.5 | 47.5 | 5 | 1,480 |
| 45 | 45 | 10 | 1,340 |
| 42.5 | 42.5 | 15 | 1,200 |
| 40 | 40 | 20 | 1,160 |
| 37.5 | 37.5 | 25 | 1,120 |
| 35 | 35 | 30 | 1,130 |
| 30 | 30 | 40 | 1,180 |
| 25 | 25 | 50 | 1,460 |

| | | B | |
|---|---|---|---|
| 49.9 | 49.9 | 0.2 | 1,460 |
| 49.75 | 49.75 | 0.5 | 1,380 |
| 49.5 | 49.5 | 1 | 1,320 |
| 49 | 49 | 2 | 1,320 |
| 48.5 | 48.5 | 3 | 1,420 |
| 48 | 48 | 4 | 1,480 |

| | | Nb | |
|---|---|---|---|
| 49 | 49 | 2 | 1,560 |
| 47.5 | 47.5 | 5 | 1,520 |
| 45 | 45 | 10 | 1,520 |
| 40 | 40 | 20 | 1,600 |

The brazing alloys of this invention may be made by several well known methods including arc melting, followed by casting into buttons, or by standard powder metallurgical techniques to form alloy compacts. When possible, the resultant buttons or compacts are rolled into sheet form. If the ternary alloy is not sufficiently ductile or too brittle for rolling it is sufficient to crush them to provide small fragments. To test its brazing capacity, the resultant alloy sheet, fragment, or even powder is placed at one end of a three-inch long inverted T specimen made from, for example, tantalum. The brazing alloy is melted to a temperature at least 50° above its melting point and the degree of flowability is determined to be excellent if the melted alloy flows along the entire length of the T specimen. Such alloys have invariably produced an acceptable braze as measured by ductility and shear strength of the resultant joint. Alloys which successfully flow the three-inch distance were capable of being bent 90° without fillet cracking and were subsequently used as brazed filler metals for joining Miller-Peaslee shear specimens. After forming the brazed joint, room and elevated temperature shear testing was conducted on the brazed composites. The compositions, melting temperature, and shear strength of joints made between Ta–10 weight percent W and TZM specimens with representative brazing alloys of the subject invention are shown in the table below.

Based on the shear strength data at room and elevated temperature, the braze alloy containing Ta or B would be the brazing alloy of choice. The tantalum-bearing braze alloys are of particular utility since they wet and flow much more easily on ceramic surfaces to form strong joints in comparison to the other ternary systems. The thermal ratio allows comparison of the shear strength braze alloy independent of temperature.

What is claimed is:

1. A brazing alloy having particular utility for brazing parts of (a) a refractory metal selected from the group consisting of tantalum, molybdenum, titanium, and niobium, and alloys thereof, and (b) ceramics such as alumina, beryllia, and titania to themselves and to each other which comprises an alloy containing equal parts, by weight, of titanium and zirconium and a ternary metal additive selected from the group consisting of tantalum, silicon, germanium, chromium, and boron, the ternary addition existing in such amounts as to form a ternary alloy whose melting point is equal to or lower than the melting point of the binary titanium-zirconium alloy.

TABLE II

| Alloy code No. | Braze alloy composition (wt. percent) | Approx. melting temp. (°C.) | Test temp. (°C.) | Thermal ratio [1] | Shear strength | | | |
|---|---|---|---|---|---|---|---|---|
| | | | | | Tested on Baldwin | | Tested on Instron | |
| | | | | | Ta–10% W | TZM [2] | Ta–10 W | TZM |
| 4A | 45Ti–45Zr–10Ta | 1,550 | RT | 0.163 | 46,470 | | | |
| | | | 1,000 | 0.698 | 19,635 | 22,240 | | |
| | | | 1,400 | 0.918 | 3,555 | 9,185 | | |
| 5A | 49Ti–49Zr–2Si | 1,250 | RT | 0.196 | | | 32,335 | 16,060 |
| | | | 950 | 0.803 | 12,610 | | | |
| | | | 1,000 | 0.836 | | 10,615 | | |
| | | | 1,250 | 1.000 | | | 38,065 | |
| | | | 1,400 | 1.098 | 1,600 | 4,740 | | |
| 8B | 46Ti–46Zr–8Ge | 1,250 | RT | 0.196 | 54,215 | 27,745 | | |
| | | | 850 | 0.737 | 7,265 | | | |
| | | | 1,000 | 0.836 | 5,550 | 16,455 | 40,680 | |
| | | | 1,100 | | | | | 22,825 |
| | | | 1,200 | 0.902 | | | 26,640 | |
| | | | 1,250 | 0.967 | | | | 24,920 |
| | | | 1,400 | 1.098 | | 3,675 | | |
| 9C | 35Ti–35Zr–30Cr | 1,025 | RT | 0.230 | 46,610 | 31,150 | | |
| | | | 1,000 | 0.981 | 10,580 | 12,750 | | |
| 10B | 49Ti–49Zr–2B | 1,250 | RT | 0.196 | 45,750 | 33,865 | | |
| | | | 1,000 | 0.836 | 9,840 | 16,570 | 42,275 | 35,885 |
| | | | 1,200 | 0.902 | 3,430 | 26,470 | 47,645 | 23,835 |

[1] Thermal Ratio = test temperature, °K./melting temperature, °K.
[2] Nominal—Mo-.5Ti-.08Zr-.02C.

References Cited

UNITED STATES PATENTS

| | | | |
|---|---|---|---|
| 3,027,255 | 3/1962 | Begley et al. | 75—174 |
| 3,038,249 | 6/1962 | Gilliland et al. | 75—175.5 X |
| 3,131,059 | 4/1964 | Kaarlela | 75—134 |
| 3,220,828 | 11/1965 | Kaarlela | 75—134 |
| 3,262,778 | 7/1966 | Kaarlela | 75—134 |
| 3,293,741 | 12/1966 | Gilliland | 75—134 X |
| 3,408,604 | 10/1968 | Doi et al. | 75—134 X |

L. DEWAYNE RUTLEDGE, Primary Examiner

E. L. WEISE, Assistant Examiner

U.S. Cl. X.R.

75—175.5, 177